Feb. 13, 1940.  J. VAN N. DORR  2,190,596
FLOCCULATION PROCESS AND APPARATUS
Original Filed June 14, 1935  8 Sheets-Sheet 1
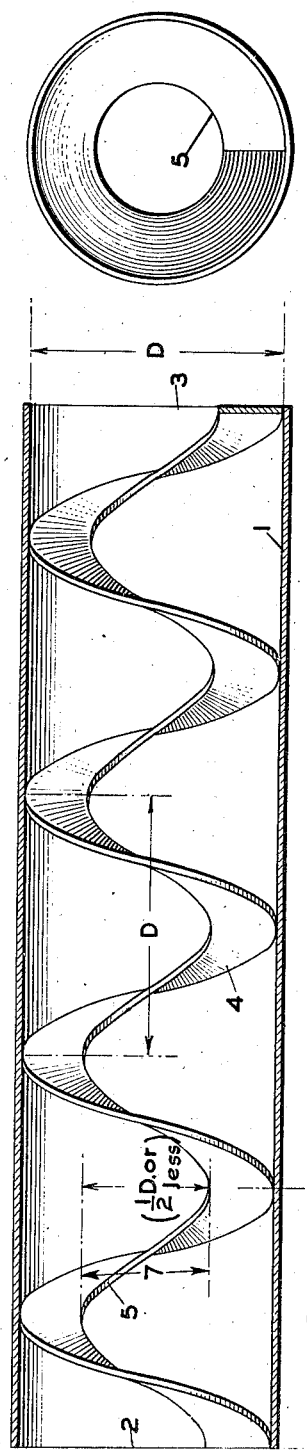
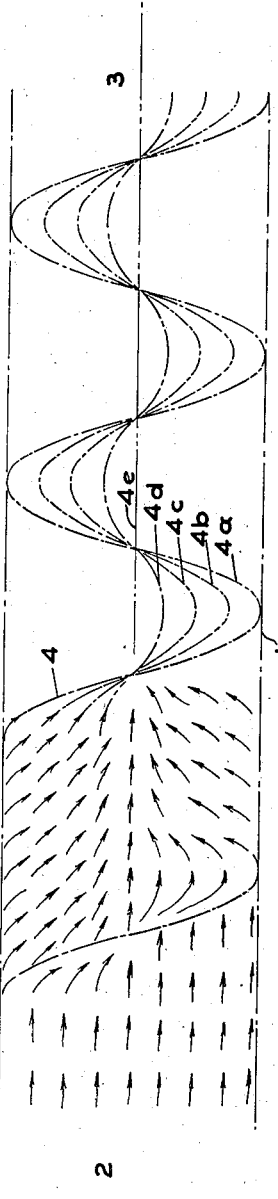
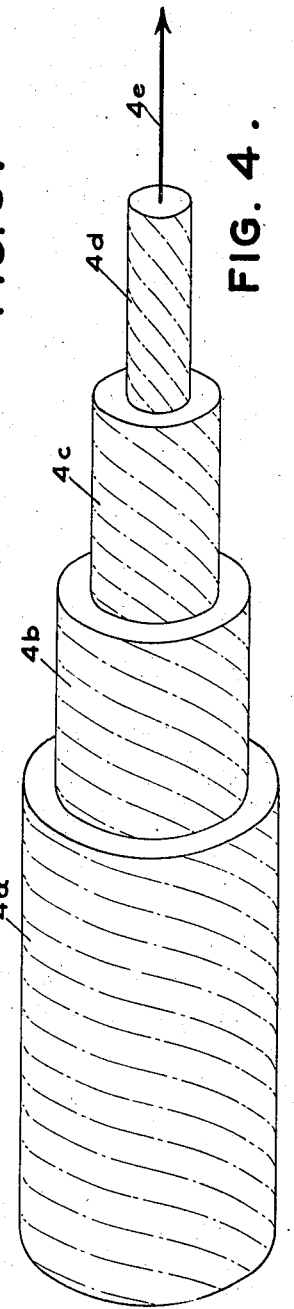
INVENTOR
JOHN V. N. DORR,
BY
ATTORNEY.

Feb. 13, 1940.  J. VAN N. DORR  2,190,596
FLOCCULATION PROCESS AND APPARATUS
Original Filed June 14, 1935   8 Sheets-Sheet 2
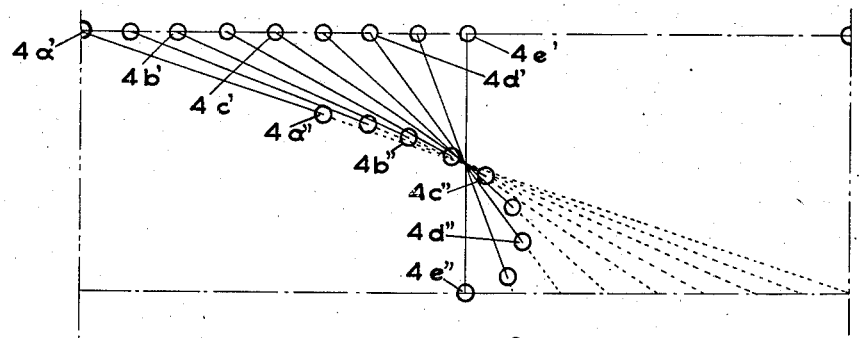
FIG. 6
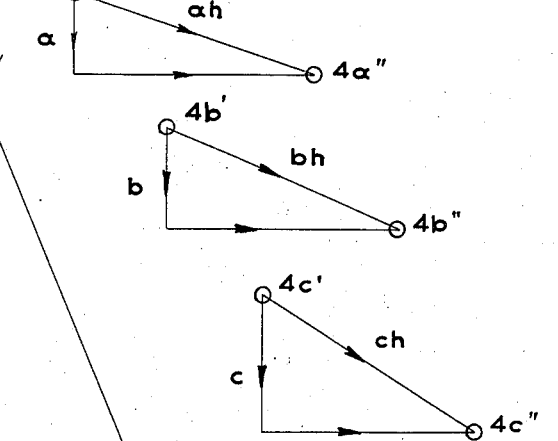
FIG. 7
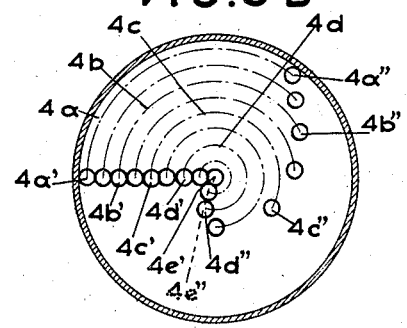
FIG. 5 B
FIG. 5 A
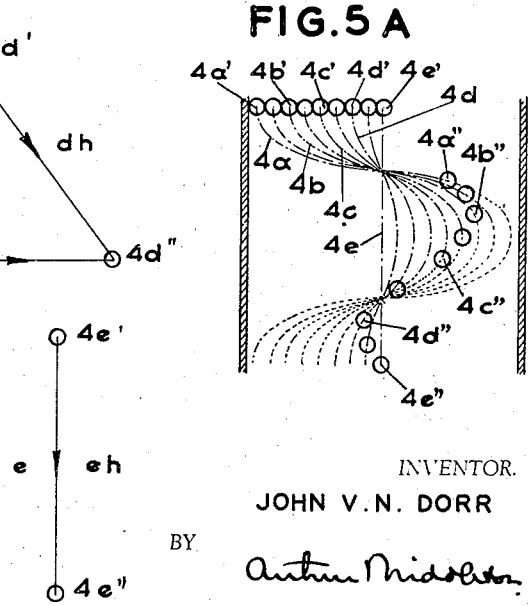
INVENTOR.
JOHN V. N. DORR
BY
ATTORNEY.

INVENTOR
JOHN V. N. DORR.
ATTORNEY.

Feb. 13, 1940. J. VAN N. DORR 2,190,596
FLOCCULATION PROCESS AND APPARATUS
Original Filed June 14, 1935 8 Sheets-Sheet 4

INVENTOR
JOHN V. N. DORR,
BY
ATTORNEY.

Feb. 13, 1940.    J. VAN N. DORR    2,190,596
FLOCCULATION PROCESS AND APPARATUS
Original Filed June 14, 1935    8 Sheets-Sheet 5

INVENTOR.
JOHN V. N. DORR
BY
Arthur Middleton
ATTORNEY.

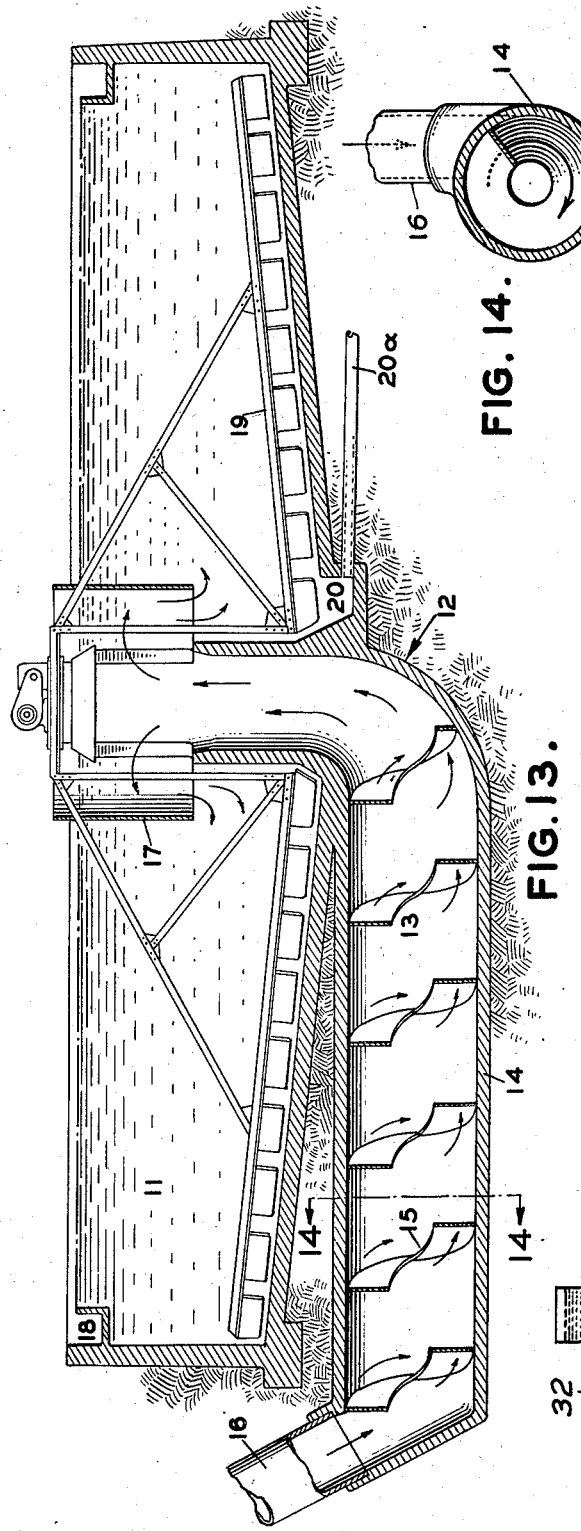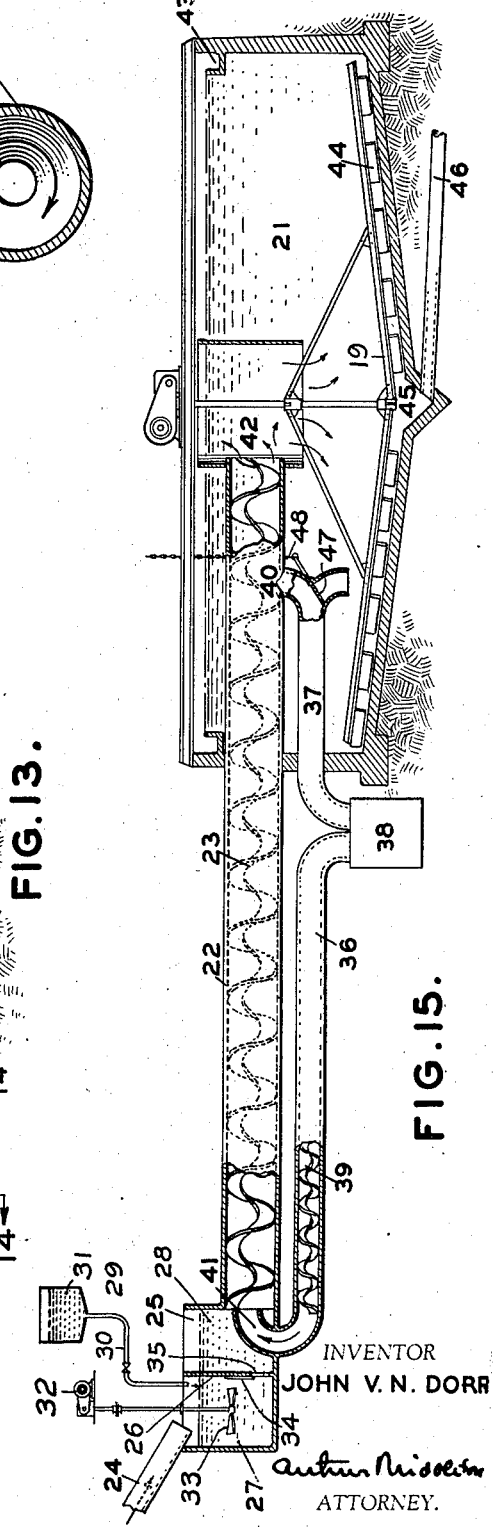

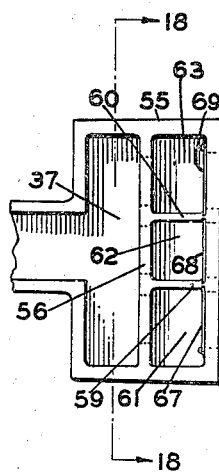
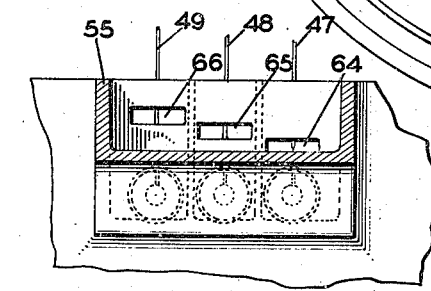
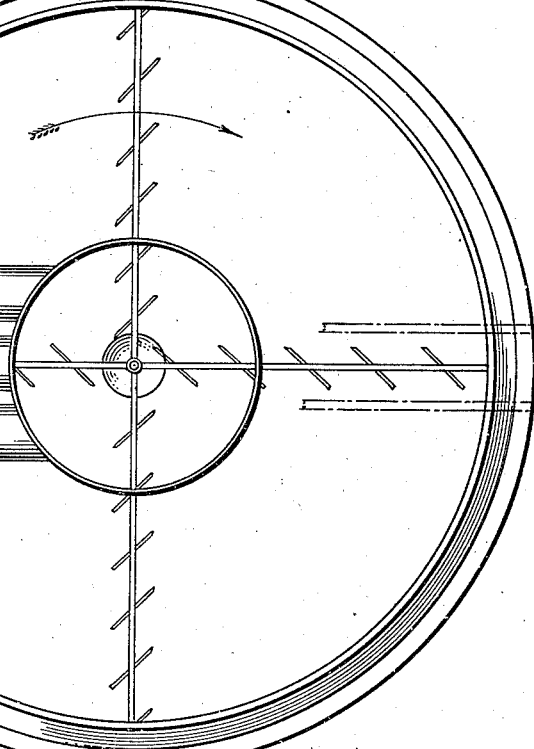
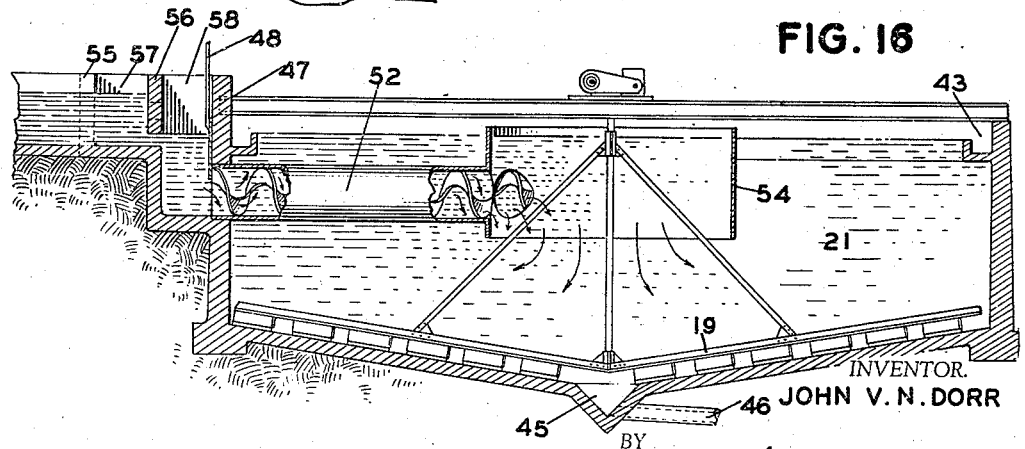

Feb. 13, 1940.    J. VAN N. DORR    2,190,596
FLOCCULATION PROCESS AND APPARATUS
Original Filed June 14, 1935    8 Sheets—Sheet 8

INVENTOR
JOHN V. N. DORR
BY
ATTORNEY.

Patented Feb. 13, 1940

2,190,596

UNITED STATES PATENT OFFICE 2,190,596

FLOCCULATION PROCESS AND APPARATUS

John Van Nostrand Dorr, Westport, Conn., assignor to The Dorr Company, Inc., New York, N. Y., a corporation of Delaware Application June 14, 1935, Serial No. 26,571
Renewed October 31, 1939

8 Claims. (Cl. 210—12)

This invention relates to a process and apparatus for effecting the clarification of turbid liquid by flocculation followed by sedimentation or other dewatering devices, such as filter means, centrifuges, etc., and particularly to the step of flocculation when induced or assisted by agitation, but with a minimum (if any) of turbulence within the liquid body.

The invention primarily involves a process according to which a flocculation step is furthered or realized by imparting helical motion to the constituent sections of a flowing stream of the liquid of a character to impart gradual, gentle but insured relative movements of adjacent portions, lamellae or sections of the stream whereby the flocculation operation as a whole is induced or assisted, thus creating conditions favorable to floc formation and maintenance.

The invention of this case revolves about the movement of a particle or other unit such as a lamella or a cylindric section relative to a juxtaposed particle or unit where each such unit has an orbital component of movement in respect to every other particle or unit occupying a different radial location from the particular unit under consideration, and a linear component in a direction paralleling the axis about which the orbital movement takes place, with the result that is indicated elsewhere in the specification; each particle, lamella or section also having a three-direction movement in respect to each and every other particle which has a radius of movement different from that of the particle under immediate consideration. That is, this invention depends upon setting up a complex circularity of movement of adjacent particles of turbidity to be flocculated whereby adjacent concentric lamellae of liquid are moved co-currently at differential speeds in more than one direction.

The invention herein described is applicable to or employable in or for the clarification, purification, softening or other treatment of any water or other liquid that responds or is responsive to the process herein disclosed.

The expression "liquid" as employed herein is to be broadly construed, and by way of illustration and not in a limited sense it is to be construed as including any liquid no matter where found or derived that is responsive to the invention hereof—water frequently referred to as raw water, water frequently referred to as contaminated water, water containing trade waste, water containing or constituting a part of sewage, water containing suspended solids and existent, for example, as slurries, or liquid containing ingredients directly responsive to flocculation or responsive to flocculation after chemical, bacteriological or biological treatment.

Many waters and most turbid liquids of industry contain such very finely divided solids that the settling rate of each suspended solid particle is so slow that the removal of these by sedimentation would be economically prohibitive. However, if the particles naturally coalesce or flocculate, the settling rate of the flocs is then so vastly increased that sedimentation becomes quite an inexpensive and therefore widely usable method of clarifying such liquids.

Heretofore the term "coagulation" has been applied rather loosely to the entire process involving the adding of chemicals to turbid liquids, the inducing of flocculation of the chemical precipitate, the causing of the chemical precipitate to agglomerate into flocs with the consequent catching or entrapping of suspended material that otherwise imparts turbidity to the liquids, and finally to the eliminating or removing of the flocculated or agglomerated solids by steps involving sedimentation and/or filtration.

Flocculation is a property exhibited by colloids and most fine materials in suspension and according to which there is a tendency to coagment, aggregate or gather together to form much larger bodies or flocs.

This property of flocculation is one resulting from the presence of dissolved salts or electrolytes or from the addition of certain chemicals of an order or character to destroy an electrolytic tendency of the solids to repel each other and to make it possible for the particles to re-arrange or readjust themselves whereby there is developed a tendency to adhere or coalesce due to mass attraction or to the cohesive tendencies of similar bodies.

Many turbid fluids met with in practice already contain sufficient electrolyte although the resultant intensity of flocculation may vary considerably. In the case of concentrated slurries, flocculation is very rapid and sometimes a matter of seconds. In the cases of sewage solids, and of aluminum hydrate resulting from water treatment, the time required to reach a degree of flocculation sufficient to permit the economic removal of the solids by sedimentation is more of the order of one-half to four hours or more. It has been found that the rate of flocculation is affected to a remarkable degree by the extent to which particles are mechanically brought together or otherwise caused to collide; in other words, by the degree of agitation, contacting or number of impacts. In the sedimentation zone of a sedimentation process or apparatus, material agitation to assist flocculation is impractical since it would defeat sedimentation. To carry out the flocculation merely by allowing a sufficient period of quiescence in the sedimentation zone is inefficient because of the unnecessarily long time required under these conditions for the particles to come into contact. The logical solution has therefore been the separation of the operation into two distinct stages, namely: flocculation and sedimentation.

The process of coagulation, as that expression is employed herein, may be viewed in general as divided into two distinct stages. The first of these consists in conditioning the fluid so that flocculation is possible. That is, if the fluid does not already contain sufficient electrolyte it must be added and thoroughly mixed into the fluid. This invention is not necessarily concerned with this phase of the operation for, according to the broader aspects thereof, it presupposes a fluid which is in condition to flocculate regardless as to whether electrolyte normally exists in the fluid or had to be added to the fluid. The second stage is that during which aggregation or coagmentation of the colloidal particles takes place by virtue of which there are obtained flocs of the desired size. It has been demonstrated that a certain amount of stirring will accelerate coagmentation, floc formation and floc amassment under conditions permitting flocculation to take place when the particles approach to within the sphere of attraction of the other particles present. The function of this agitation is to increase the probability of collision or contacting of the particles after the charges on these particles have been neutralized. If, within the sphere of attraction of a particle the tendency to attract another particle is greater than the tendency of the charge of the particle to repulse the charge of the second particle, a condition may be visualized whereby coagulation could be brought about even with slightly adverse chemical conditions. Agitation under these conditions must be such as to overcome the repulsive forces between the particles, impelling them within the sphere of attraction of one another and in this way promoting flocculation. The more nearly neutral the particles, that is, the greater the intensity of flocculation or tendency to flocculate, the less would be the velocity of agitation necessary to bring about the conditions mentioned. There is, of course, a definite upper limit to be avoided where the violence of agitation is such that the tendency to disintegrate or break up the relatively fragile aggregates or flocs formed is greater even than the tendency for the particles to adhere to one another within the sphere of attraction.

Chemical dosing and flocculation may be said to be complementary—the stronger the concentration of electrolyte, the stronger will be the intensity of the particles to coalesce, within certain limits, and if this urge is great, the benefit to be derived from and the necessity of agitation may be correspondingly decreased approaching an agitation which is quite negligible. On the other hand, as the concentration of the electrolyte is decreased, the tendency to flocculate becomes so weak that the contacting assistance of agitation becomes a very important factor. However, in the case of flocs formed under conditions of low electrolyte concentration and prolonged agitation, the forces tending to hold the particles together are weak and any undue agitation would tend to destroy the flocs. Therefore, in cases where flocculation by agitation is a major factor of the operation, great care must be taken to handle the flocs delicately so that they will not be subsequently destroyed.

It has been found that this precaution has been neglected in many previous apparatus developed for this purpose.

Heretofore, turbulence, eddy currents, swirls, violence and other factors which might be mentioned were considered necessary to effect flocculation by agitation.

For some time we have been analyzing and considering the fundamental principles underlying mechanically induced flocculation and have been experimenting with flocculation and working on the problems relating thereto having in view the ultimate development of new, improved and more efficient processes and/or apparatus for carrying out such work. Our endeavors have led to the studied analysis and consideration of various devices and the operation thereof, and the result of the research conducted has demonstrated the fact that the employment of a helical or screw-shaped flight in a flowing stream is peculiarly helpful in the furthering or realizing of an efficient and effective flocculation.

A study of the invention herein disclosed develops many objects or aspects to which the invention may be considered as directed, and certain of said objects or aspects are specifically listed herein.

One object of this invention is to provide a degree and type of agitation or movement of one curved layer, lamella or section of liquid relative to the adjacent layer or lamella most beneficial for the formation of flocs of uniform and maximum size in a minimum period of time. It may be desirable to obtain the objective just mentioned without the use of any moving mechanism.

The invention according to one aspect thereof relates to a process wherein the desired degree and type of agitation, or that liquid movement which is beneficial to the formation of flocs, is obtained by the creating—due to relatively fixed and defined deflecting means—of continuously changing helical flows in the various sections of a flowing stream containing ingredients that impart turbidity to the liquid and as to which flocculation is employed in the elimination thereof.

The invention according to another aspect thereof relates to an apparatus comprising a conduit preferably but not essentially of true cylindric cross section and having therein and extending along the same a screw or screw-shaped flight that imparts a helical flow to a stream of fluid flowing therethrough and while subjected to the spiralized flocculation treatment herein described. According to the broader aspects of the invention, this conduit may be of a relatively horizontal open top type, but in that event the depth of liquid flowing therethrough should be approximately the depth of the vertical over-all dimensions of the helical or screw-shaped flight so that the entire vertical cross section of the longitudinal flowing stream is under the operative and spiralizing influence of the helical or screw-shaped flight.

The invention according to another aspect or phase thereof contemplates the employment of a chemical reagent or of other dosing material as, for example, some of the returned flocculated material which is preferably supplied or applied to the liquid passing to and into the flocculating means for flocculating treatment therein.

The invention according to another phase or aspect thereof contemplates the employment of means which from one point of view may be considered as constituting part of the flocculating means and which from another point of view may be considered as an adjunct of the flocculating means, and which means in any event can be relied upon for causing the supply and delivery to and into the incoming liquid of the material for furthering or for favoring the flocculation which is carried out in the spiral-defining flocculating means. As above indicated, the means just referred to may be provided by means for introducing a chemical reagent for inducing flocculation to or into the incoming liquid; the means referred to may also be realized by a construction according to which some of the flocs after having been produced are returned surely but gently to, and into the liquid undergoing treatment whereby the returned flocs can aid in the production of other flocs; or the means referred to may broadly comprehend the return of sludge derived as the result of sedimentation of the liquid containing the flocs whereby the returned sludge can be employed to aid or assist in the floc forming operation herein described.

The invention hereof also contemplates the employment of means for insuring the proper mixing of the material introduced or reintroduced into the stream about to undergo or undergoing flocculation treatment. Where the floc formation has been initiated any introducing of material to aid the floc formation should be gradual and gentle. Where a chemical dosing is applied before substantial floc formation has taken place, then the mixing of the chemical reagent can be relatively violent and positive. Thereafter, however, it is essential that the chemically dosed material be brought into the region where substantial flocculation has taken place in a gentle but positively agitated manner.

The invention hereof revolves about a process and apparatus whereby and according to which flocculation processes employing the introduction of flocculating agents can be carried out under conditions conducive to an efficient and practical performance of the same and, as above indicated, an essential characteristic of such invention is the employment of steps or means whereby a helical flow effect of the liquid stream undergoing treatment is realized or attained.

A still further object is to permit the incorporation of the flocculation device into or in direct association with a sedimentation unit.

A further object of the invention is to provide a device capable of conveying or transferring flocculated fluid suspension considerable distances without disintegration of the floc structure.

The invention possesses other objects and features of advantage, some of which with the foregoing will be set forth in the following description. The novel features that are considered characteristic of this invention are set forth with particularity in the appended claims.

In the following description and in the claims parts will be identified by specific names for convenience but they are intended to be as generic in their application to similar parts as the art will permit. In the accompanying drawings which constitute a part of this specification there have been illustrated the best and most characteristic embodiments of the invention known to the undersigned but such embodiments are to be regarded as typical only of many possible embodiments and the invention is not to be limited thereto.

In said drawings:

Fig. 1 shows a plan view or sectional elevation of one form of tubular device—frequently referred to herein as a flocculating means—employable for accomplishing the favorable flocculation result. According to the showing of this figure, the upper or near side of the tube is removed so as to show the screw or screw-shaped flight which is preferably fixedly positioned therein.

Fig. 2 is an end elevation of the device shown in Fig. 1.

Fig. 3 and Fig. 4 diagrammatically illustrate the flow paths of different sections of the flowing stream. These figures graphically illustrate the relative movement — sometimes referred to herein as sliding movement or as slip-plane movement—of concentric lamellae or of one section or particle in respect to inwardly and outwardly disposed adjacent sections or particles and under conditions such that there follows a sliding or shear movement of the one section or particle in respect to the adjacent parallel sections or particles, which sliding or shear movement essentially is gentle enough not to encourage disintegration or breaking up of the flocs.

Fig. 5A is a longitudinal view and Fig. 5B is a transverse view graphically illustrating the relative positions which certain radially disposed particles or stream sections have at one section of the flowing stream of liquid passing through the flocculating means of Figs. 1 and 2—and which stream flow is diagrammatically and graphically illustrated in Figs. 3 and 4. Said Figs. 5A and 5B also illustrate each of said particles or stream sections in substantially changed relative position to the other of said particles or stream sections at the end of a unit-time-period of flow. These figures typify how each particle or stream section continuously changes its relative position in respect to all other particles or stream sections of different radial dispositions, and how the original arrangement is never restored. Fig. 5A particularly illustrates the full paths of travel of the particles as they pass from the aligned position through a section of the tube or conduit.

Figure 5C:
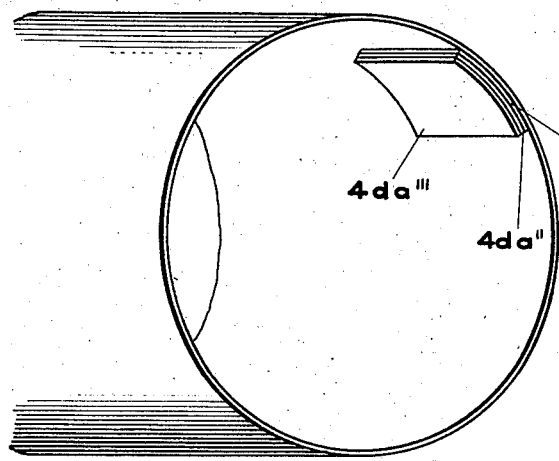
Figure 5D:
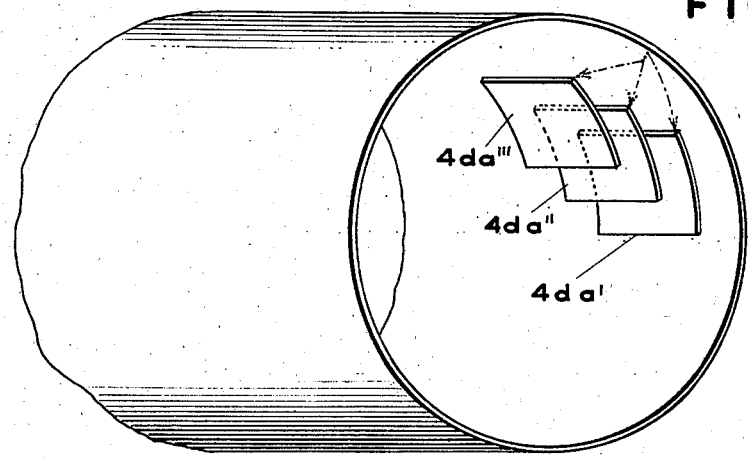
Figure 5E:
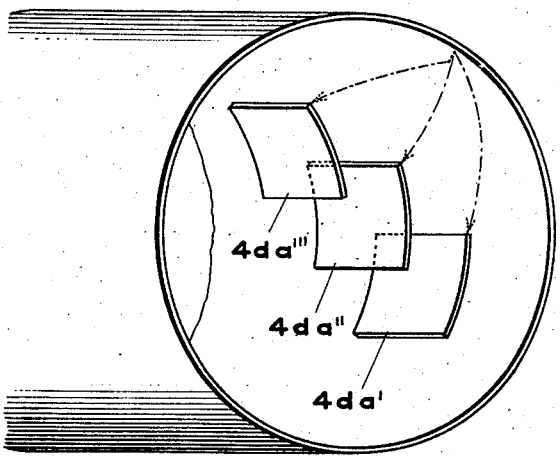

Figs. 5C, 5D and 5E diagrammatically illustrate three typifying concentric lamellae or stream sections and said respective figures are indicative of the positions which the lamellae successively occupy relative to each other incident to the helical spiralized flow of the stream resulting from the guiding influence of a helical or screw-shaped flight stationarily located within the pipe or conduit through or along which the stream flows.

Fig. 6 graphically illustrates quantitatively the flow paths of the particles graphically illustrated in Figs. 5A and 5B; Fig. 6 is in effect a view illustrating the developing or unrolling of the several diagrammatically illustrated flow paths of Figs. 5A and 5B and the superpositioning on a flat surface of the thus unrolled sections.

Fig. 7 graphically illustrates the directional and velocity magnitude values or vectors of particles—or stream sections—travelling in various sections or parts of the flowing stream which is graphically illustrated in Figs. 3, 4, 5A and 5B.

Figure 9:
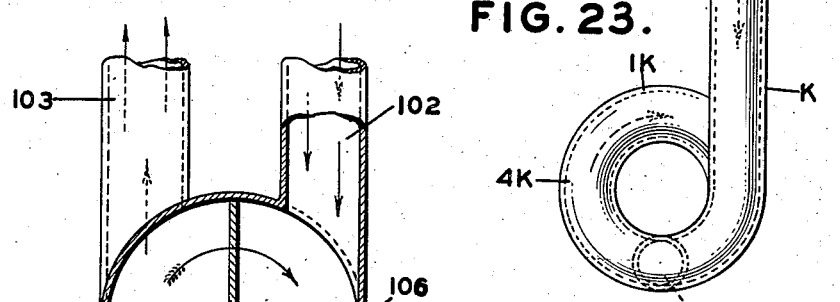
Figure 8:
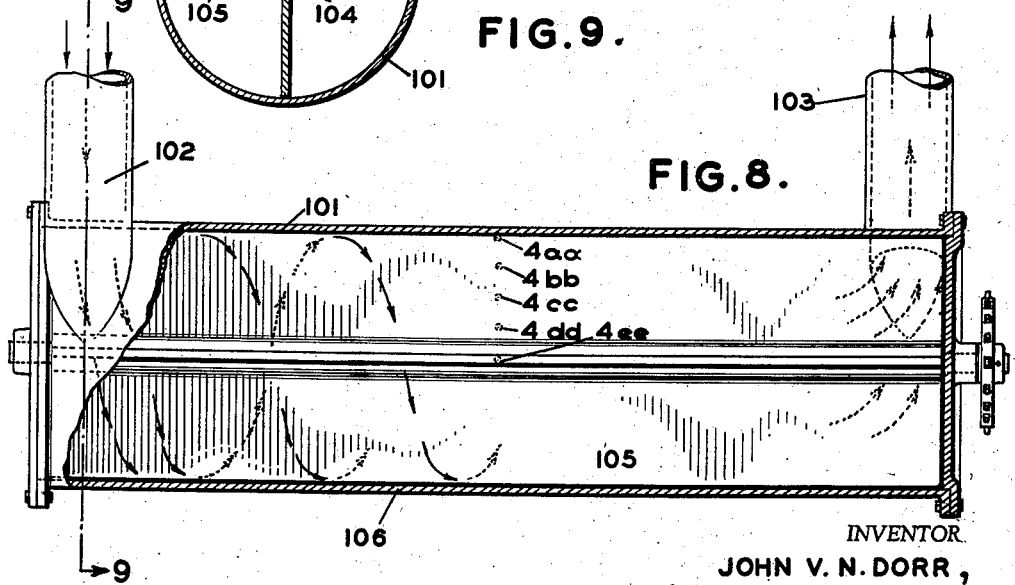

Figs. 8 and 9 typically illustrate a form of flocculation device in use prior to our invention. In said prior construction there is a conduit into which liquid can be fed at one end and from which it is delivered from the opposite end and wherein means providing rotating paddles are employed that can be relied upon to bodily turn the liquid of the fluid stream around a horizontal axis as the device functions. In the functioning of this prior apparatus each particle or section of the fluid stream per unit of time has the same angular movement about the horizontal axis and also the same forward movement parallel to the axis, thus failing to realize the advantageous slip or shear movement described in conjunction with the new types of flocculating means herein illustrated and described. The construction of Figs. 8 and 9 is herein inserted, described and referred to as a means of comparison whereby the essentials of the present invention will be more vividly realized and appreciated. It is to be understood that the arrangement of Figs. 8 and 9 does not realize the invention hereof either by its construction or as it functions.

Figure 10:
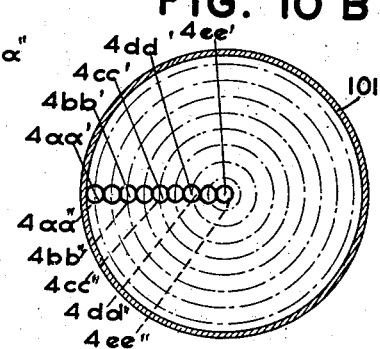
Figure 10:
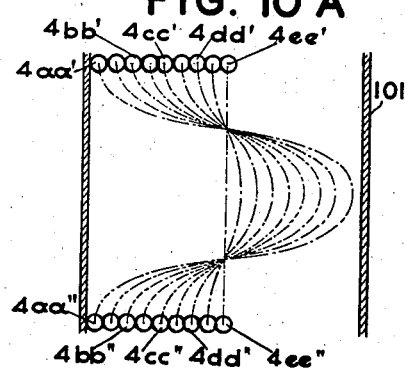

Fig. 10A is a longitudinal view and Fig. 10B is a transverse view graphically illustrating the position which certain radially disposed particles or stream sections have at one section of the flowing stream of liquid passing through the apparatus of Figs. 8 and 9, and how the radial disposition—and alignment is retained even while the stream is flowing through the tube or conduit of the apparatus and even while the stream is being bodily turned or rotated about a longitudinal axis because of the paddle construction.

Figure 11:
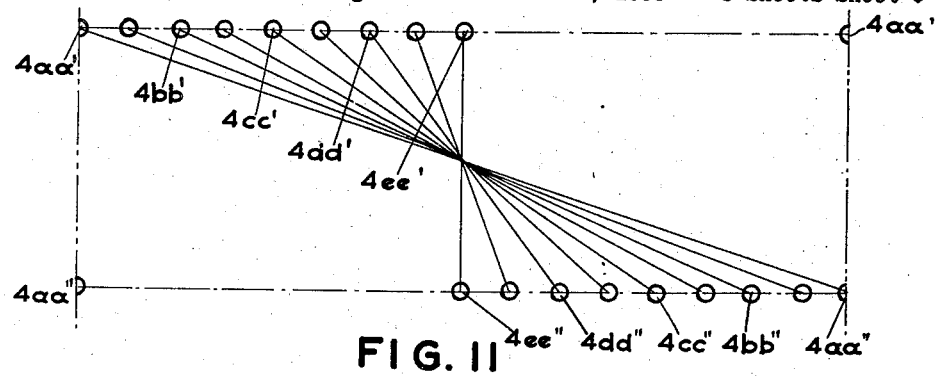

Fig. 11 graphically illustrates quantitatively the flow paths of the particles or stream sections graphically illustrated in Figs. 10A and 10B; Fig. 11 is in effect a view illustrating the developing or unrolling of the several diagrammatically illustrated paths of particle movement of Figs. 10A and 10B and the superpositioning on a flat surface of the unrolled sections.

Figure 12:
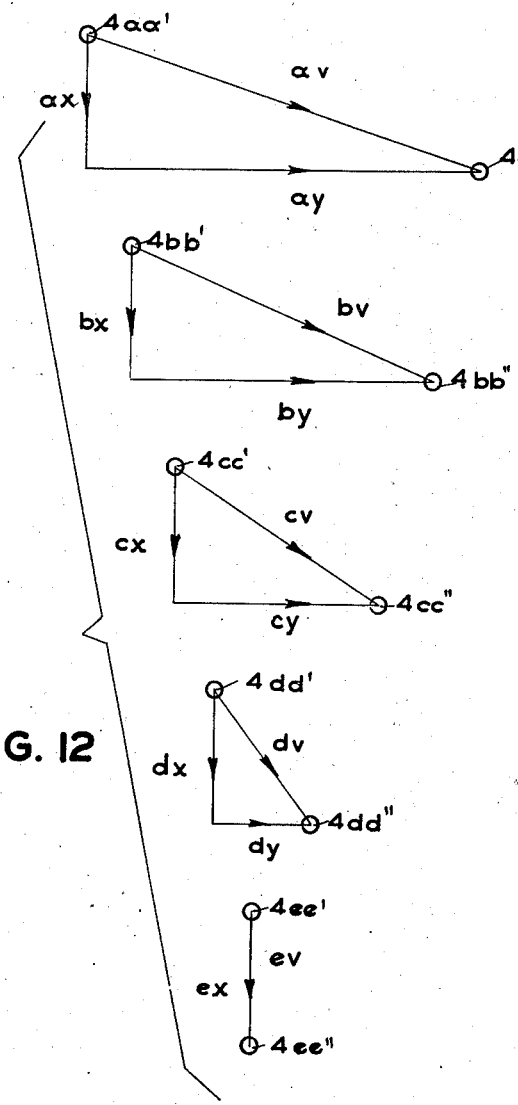

Fig. 12 graphically illustrates the directional and velocity magnitude values or vectors of particles in various sections or parts of the flowing stream as the stream passes through the tube or conduit of the prior device of Figs. 8 and 9 and in which, as previously indicated, sections of the flowing stream are bodily moved or rotated by the paddle construction of the device as the device functions. In this connection it is to be noted that Fig. 10A illustrates the full path of travel or movement of the particle and, in conjunction with Figs. 10B and 11, how the radially aligned set of particles—although bodily swung from one position to another—retains the radial alignment. Figs. 10A, 10B, 11 and 12 have been incorporated because they readily and respectively permit of analytical comparison with figures—which from certain aspects may be viewed as corresponding figures—5A, 5B, 6 and 7, and which lastmentioned figures are illustrative of that which takes place in the new flocculating means or arrangement.

Fig. 13 is a cross-sectional elevation of an adaptation of a novel flocculating arrangement of the type herein disclosed to a mechanically cleaned sedimentation tank or unit of the Dorr or traveling rake type according to which the feed is introduced through an inverted siphon. In the construction shown in this figure, the novel flocculating arrangement is provided by a horizontal conduit disposed in the lower or bight section of the siphon and the spiral and helical or screw-shaped flight or blade is located within this lower horizontal conduit section.

Fig. 14 is a cross-section of the flocculating conduit at the point where the feed pipe leading thereto is attached.

Fig. 15 is a cross-sectional elevation of an adaptation of a novel flocculating arrangement of the type herein disclosed to a mechanically cleaned sedimentation unit of the Dorr type, according to which the feed or influent supplied to the sedimentation unit is introduced through a horizontal conduit of the flocculating arrangement that delivers into an influent delivery section that is centrally disposed with respect to the tank or basin of the sedimentation unit. In the arrangement of the flocculating means shown in this figure, (15) provision is made for the return of some of the flocculated material from the delivery end or section of the horizontal flocculating conduit to the intake end thereof.

Fig. 16 is a vertical sectional elevation showing an adaptation of a flocculating arrangement embodying the novel features of a flocculating arrangement of the type herein disclosed to a mechanically cleaned sedimentation unit or tank of the Dorr type. In the arrangement shown in this figure, a plurality of flocculating conduits are employed in an associated arrangement for automatically taking care of liquids supplied thereto under varying stream flow conditions.

Fig. 17 is a plan view of the arrangement shown in Fig. 16.

Fig. 18 is a vertical cross-sectional view particularly illustrative of the weir arrangement for controlling the flow to and through the several flocculating conduits according to varying flow conditions of the incoming liquid.

Figure 19:
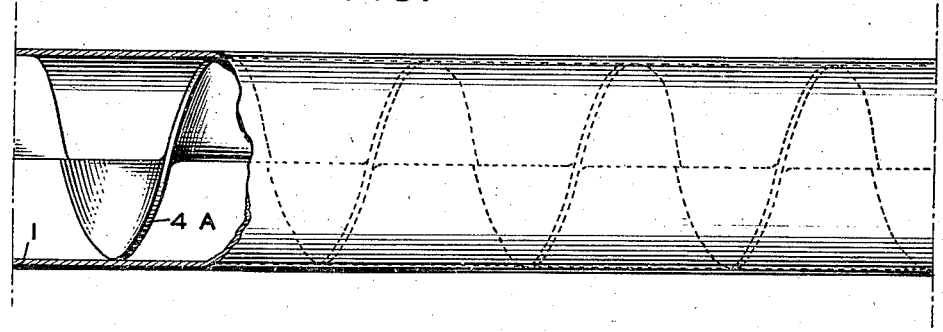

Fig. 19 is a view, partially in section, of a form of flocculating construction somewhat different from that shown in Fig. 1 but which essentially functions according to the principles described in connection with the arrangement in Fig. 1.

Figure 20:
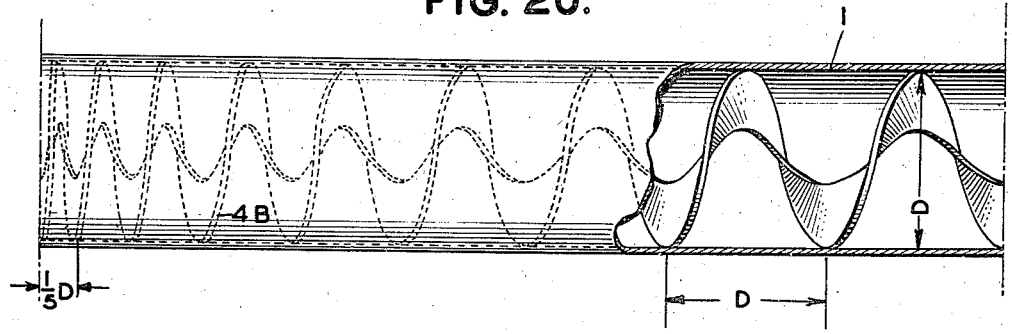

Fig. 20 is a view, part of which is shown in section, of a flocculating construction employing the essential features of the invention herein disclosed, but in the arrangement of Fig. 20 the helical or spiral-shaped flight or blade has progressively varying pitches.

Figure 21:
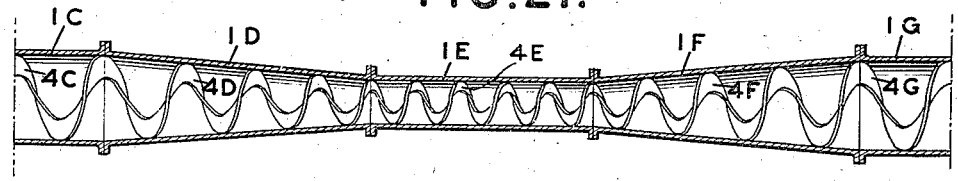

Fig. 21 is a view, part of which is shown in section, of still another form of flocculating construction embodying essential features of the invention herein disclosed. In the construction of this figure, the conduit progressively decreases and thereafter progressively increases, and there is also progressive decrease and thereafter progressive increase of the linear pitch of the screw-shaped flights or blades.

Figure 22:
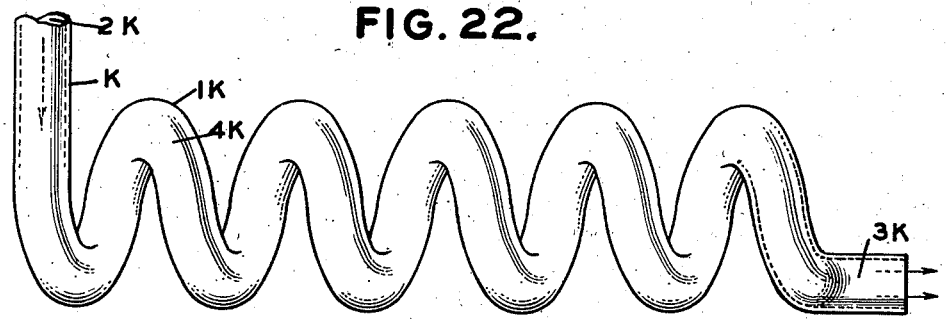
Figure 23:
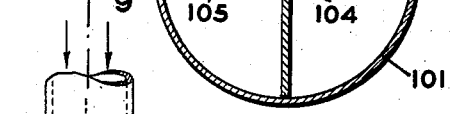

Fig. 22 and Fig. 23 are respectively longitudinal and end views of a flocculating arrangement broadly employing certain essentials of the invention herein disclosed. According to the construction of Fig. 22 and Fig. 23 the helical or screw-shaped path, along which the fluid stream is caused to travel under conditions to realize or effect the gentle sliding or slipping movements which aid or further flocculation, is attained by a helically bent tube that provides the conduit and also in effect helical or screw-shaped baffles that control or effect the stream movements.

Reference will now be made to the drawings in detail:

Flocculation principles as illustrated in Figs. 1 to 7 inclusive

In Fig. 1 and Fig. 2 there is illustrated an arrangement of parts and the functioning thereof according to which an efficient and effective flocculation operation is realized as the device functions.

Figs. 3 to 7 inclusive have been incorporated and are herein described in connection with the construction shown in Fig. 1 and Fig. 2, primarily in support of an explanation of the operation that actually takes place when a stream of liquid containing particles or other content susceptible to flocculation is passed through an apparatus such as is illustrated by Fig. 1 and Fig. 2, namely, through an apparatus comprising a conduit having therein a screw-shaped or helical-shaped blade that imparts a defined spiralized flow to the stream as it passes through the conduit. The primary purpose of such showing as illustrated in and by Figs. 1 to 7 inclusive and the descriptions thereof, has in view the presenting of what is believed to be a sound theory as to why the positively insured and defined spiralizing effect is so advantageous in furthering or aiding flocculation or flocculating operations.

The apparatus employed essentially comprises a tube or conduit 1 with open ends 2 and 3, and inside of this tube there is preferably fixedly positioned a relatively close fitting member 4 in the form of a screw-shaped or spiral-shaped flight sometimes referred to as a screw. In the construction as shown in Fig. 1, this tube or conduit is cylindrical, but it is possible to employ forms that are not essentially cylindrical as will hereinafter more clearly appear, although for most purposes this cylindrical form is preferred. For theoretical ideal conditions the screw 4 should be solid, or, in other words, it should extend all the way from the inside perimeter of the tube to the cylindrical axis (very much after the order of the construction shown in Fig. 19 and hereinafter referred to). Actually in practice, however, it has been found that the construction cost can be materially reduced and without appreciable detriment to the results obtained by using a screw-shaped or spiral-shaped flight or blade of a construction to leave an open center or core-shaped opening 5.

It will be noted that the screw or flight illustrated is of the Archimedean type having a constant linear pitch but with a consequent progressively varying pitch ratio or angle of flow as one passes inwardly from the inside of the peripheral wall or shell of the tube towards the axis or longitudinal center of the tube. In the unit of construction shown in Fig. 1 the inside diameter of the tube is one or unity and the linear pitch of the screw-shaped flights is one or unity. The pitch angle or slope at the perimeter of the stream flowing through the tube is the angle of flow which the stream section under immediate consideration makes with respect to a line coincident with or parallel to the longitudinal axis of the conduit. The value of the tangent of such angle is indicated by the algebraic expression $$\frac{\pi D}{P}$$

in which $\pi = 3.1416$, D equal the diameter of the cylindrical section of the particularly involved section of the flowing stream, and P equals the linear pitch of the flow or of the flow-defining flights for the particularly involved section of the flowing stream or flight.

The angle of flow of a particle in the flowing stream or—as otherwise viewed—of a particular section of the flowing stream, in respect to a line extending parallel to the longitudinal axis of the conduit, is therefore herein referred to as the flow pitch angle, and the tangent value thereof as above outlined is indicated by the ratio of the true length of the circumference of the cylindrical section in which the particular particle or section travels to the length of the actual or constructively defined linear pitch of the particular particle or section.

More specifically, the value of the tangent of the flow pitch angle of the section of the stream immediately adjacent the inside of the peripheral wall of the conduit 1 is $\pi$, (namely 3.1416) multiplied by the interior dimension of the tube (and which interior dimension in the case of Fig. 1 will be considered as unity or 1), divided by the linear pitch or distance between corresponding screw flights of Fig. 1 (and which, in the case of Fig. 1 is 1 or unity). Likewise, the value of the tangent of the pitch angle for a stream particle or section which is located at a distance half way between the inside of the peripheral wall of the tube or conduit on the one hand and the longitudinal center of the tube or conduit on the other hand, is $\pi$ times one-half the diameter divided by the linear pitch, namely, $3.1416 \times .5$ over 1. Continuing as to the section immediately along the central longitudinal axis of the tube or conduit, for example, to a section the diameter of which is 1/1000 of the interior diameter of the tube, then the tangent of the pitch angle becomes $3.1416 \times .001$ over 1. At the very center of the tube the pitch angle completely disappears and the tangent thereof is zero.

In short, it is believed that the foregoing explanation indicates and demonstrates the fact that for the various sections of the flowing stream that are subject to the spiralizing effect of a helical or screw-shaped flight, the angle of slope as indicated by the tangent thereof is largest in the immediate vicinity of the interior of the conduit and gradually decreases in each of the sections as one passes from the wall portion of the conduit toward the center thereof until at the central line thereof—assuming the center of the conduit is unobstructed—there is a theoretically straight flow with no angle of slope being imparted to the particles or sections located at and along the central longitudinal axis of the conduit.

Essential novelty respecting the flocculation operation lies in the unique motion imparted to the fluid whereby a tremendous amount of relative fluid movement is obtained without any violently disruptive forces at any point.

Fig. 3 represents the development of a solid Archimedean screw of the type illustrated in Figs. 1 and 2. If one properly analyzes the shape of the spiral, he can therefrom and thereby obtain an index of the conditions in the fluid column because the fluid, due to the directional effect of the screw, follows a path defined by the spiral. In said Fig. 3, 1 represents a cylindrical conduit, 2 the point of feed or liquid supply and 3 the point of discharge. The screw or helical-shaped flight 4 is diagrammatically illustrated by the development lines 4a, 4b, 4c, 4d and 4e, which represent the paths described by the surface of the screw-shaped flight at the various radii. The feed is shown entering at 2 in a direction parallel to the axis 4e of the conduit. Immediately upon striking the curved and sloping surface of the screw-shaped flight the fluid will take the same direction of inclination or slope as the various planes of the screw surface. As a result the whole fluid column will be caused to flow in helical paths, to wit, in directions parallel to the corresponding surface sections of the screw-shaped flight.

Fig. 4 illustratively indicates the rotating concentric lamellae of water resulting from the action of the screw. With portions of successive lamellae or layers gradually stripped away or eliminated ultimately down to the axis 4e, it will be noted that at the periphery as indicated by the section 4a the flow line or path therefor has a very steep inclination or angle of slope and the length of path for one complete turn of the spiral is at its maximum. As one approaches the center of the pipe, the angle of inclination or slope becomes less and less and the length of the circular path shorter and shorter until at the very center of the conduit, the water will theoretically be traveling only in a straight line. The length of the straight flow path will be the length of the cylindrical conduit.

Figs. 5A, 5B and 6 have been incorporated to respectively illustrate how a set of particles or stream sections which have a relatively radial alignment, as at $4a'$, $4b'$, $4c'$, $4d'$, and $4e'$, and which, because of movement as along respective paths $4a$, $4b$, $4c$, $4d$ and $4e$, become substantially changed in position relative to each other as, for example, as indicated at $4a''$, $4b''$, $4c''$, $4d''$ and $4e''$, in what may be considered as a unit time period of flow as clearly indicated when considered in conjunction with diagrammatic Figs. 3 and 4; and also to illustrate more clearly the true shape of the spiral shaped paths $4a$, $4b$, $4c$, $4d$ and $4e$ for the set of particles or stream sections which have the radial alignment as at $4a'$, $4b'$, $4c'$, $4d'$ and $4e'$ as said particles pass through the cylindrical tubular sections shown in Figs. 5A and 5B.

Figs. 5C, 5D and 5E taken together typify lamellae or stream sections as $4da'$, $4da''$, and $4da'''$ of minute radial thickness and diagrammatically illustrating the successive change of relative position thereof during the flow of the stream directed by a relatively fixed spiral or screw-shaped blade within a pipe or conduit. Starting with the position shown in 5C, it will be noted that the lamellae are radially positioned, the one directly above the other. As the stream continues its helical movement, these lamellae come to occupy successive positions typified by the showing in Fig. 5D and Fig. 5E. A comparison of these figures will make it clear that the lamellae have movements along spiral paths of which the spiral path for any one lamella has a slope or pitch different from that of the spiral path of any lamella next thereto, that the lamellae travel at like speeds but in different directions, each along the particular spiral path therefor, that each has movement relative to the others, and that each has a movement having a vertical component, a movement having a transverse horizontal component, and a movement having a longitudinal horizontal component; in other words, that each lamella or particle has in effect a three-direction movement relative to the other lamellae or particles, with the result that no two of said lamellae or particles travel in the same direction. As a consequence of the particular movements there is a gentle sliding or shear action of each lamella or stream section relative to its adjacent lamella or stream section. This type of gentle sliding or slip movement, as pointed out herein, is particularly useful in realizing the flocculation process herein disclosed.

As has already been stated herein, Fig. 6 may be considered as illustrating sections unfolded or unrolled into planes to visually indicate the particle relations to each other. This figure indicates the relative position of the particles in the direction of flow and, to a certain extent, the relative position of the particles transverse to the direction of flow. As a matter of fact each particle has a three-direction change relative to other particles, to wit, (assuming the general stream flow through a pipe section to be a horizontal longitudinal flow) a change in the horizontal longitudinal position of the particles, a change in the horizontal transverse position of the particle in respect to other particles, and a change in the vertical transverse positioning of the particle relative to the other particles. One will more readily appreciate the fact that this three-direction change of each particle relative to each other takes place by considering the diagrammatic illustrations of Figs. 3 and 4, and also particularly by bearing in mind the illustration of Fig. 6 in conjunction with the illustration of Figs. 5A and 5B. As a matter of fact each and all particles in any selected section of the stream has this three-direction change in respect to any and all other particles in the stream that occupy positions from the longitudinal axis of the tube which are of radial lengths different from that of the particle or particles in or of the selected section or sections.

Fig. 7 illustrates the directional and velocity magnitude or vectors of particles traveling in various parts of the stream as indicated by the flow triangles, $7a$, $7b$, $7c$, $7d$ and $7e$, and is based upon the proposition that—excepting any slight retarding effect due to frictional resistance—each of the several sections constituting or making up the flowing stream will have the same actual velocity when passing through the same cross-sectional area and that this law holds true even though the flow direction for a particular section should be divided or changed. The effect of the screw or helical-shaped flight—or inclined vane as the flight may properly be referred to—is merely to change the direction of flow from one parallel to the axis of the conduit to and into helical shaped paths as indicated by the flow lines of Fig. 4. Normally this change of direction would not influence the velocity but since the cross section of the stream is reduced in converting it from a straight line to a spiral flow, the velocity must increase to maintain the same capacity which is assumed to be constant. Therefore, a part of the static head of the fluid entering at 2 is converted by the inclined vane to a velocity head. The absolute velocity of particles at various points in the cross-section of the stream will remain constant for the particular cross-section as illustrated by the hypotenuses, $ah$, $bh$, $ch$ and $dh$ of the flow triangles of Fig. 7, and by the center flow line $e$ which is also lettered $eh$ in the same Fig. 7. The actual forward velocity parallel to the axis of the conduit, as illustrated by the lines $a$, $b$, $c$, $d$ of Fig. 7 —and which lines parallel the longitudinal axis of the tube or conduct 1 of Fig. 5A—will vary from a minimum at the perimeter to a maximum at the center or along the horizontal axis.

The various diagrams, namely, as illustrated by Figs. 3 to 7 inclusive, have been incorporated in conjunction with Fig. 1 in order to graphically illustrate the directional and velocity effects produced by this form of flocculating device as a proper visualization of the conditions and as an aid to a full appreciation of the invention. These figures make it clear that as the flocculating apparatus of this present invention functions (a) that there is a cylindrical fluid column; (b) that every particle, to wit, every molecule or every section of this column, follows a helical path, with possible exception as to those particles constituting the central axis; and (c) that the only particles which are following the same path, or truly parallel paths, are those at exactly the same distance from the central axis. Consequently, the only particles which are following the same paths are those which would make up cylinders of uniform diameter, and of particle or floc thickness. One may therefore dissect (or view) the rotating fluid column into (or as made up of) a multiplicity of concentric cylinders, or cylindrical sections, or lamellae, of particle thickness. Now, as illustrated in Fig. 7, which disregards frictional effect due to contact of part of the fluid with the surface of the screw or the inside surface of the conduit, every particle is traveling at the same absolute velocity or as otherwise expressed at the same rate, that is, the vector sum of the vector representing the peripheral or tangential velocity and the vector representing the horizontal or axial velocity. Since the particles constituting different cylinders or cylindrical sections travel in different directions, and since such particles have decreasing circumferential velocities as one approaches the center, whereat the circumferential velocity is zero, it follows, and is to be noted, that the resultant velocity vector in a horizontal or axial direction must increase with decreasing distances from the center. Therefore, while each said cylinder, cylindrical section or lamella will be making the same number of revolutions per unit length of the tube, they will be sliding forward inside of each other at an increasing velocity as one approaches the center.

The result of this condition is that a particle traveling in one layer while it stays in contact with the same particle in the same layer is in contact on both radial sides with particles traveling in different layers which are traveling at different speeds and therefore it will contact a large number of particles in the other layers. The effect is that we can operate at very high velocities so that we will have a very high velocity of flow with relation to a stationary point such as the tube or the earth, especially since the movement with relation to any two particles which are in contact in the fluid is relatively gentle. Moreover, since the flow within the cylindrical conduit or tube is parallel to the inner surface of the wall of the tube and the surface of the screw, and since these may be made very smooth, the destructive effect on the flocs in sliding over these surfaces is very slight especially since only a very small number of particles contact these surfaces. On the other hand, the internal contacts are tremendous.

Mention has heretofore been made of the fact that the screw-shaped flights need not be solid, or, in other words, need not extend inwardly the full distance to the very center or axis of the conduit or cylindrical pipe 1. In the construction of Fig. 1, the diameter of the core opening 5 is substantially one-half of the interior diameter of the tube or conduit 1. It has been found that the diameter 7 of the centrally disposed opening or core 5 should not exceed 10% to 50% of the inside diameter of the conduit or pipe 1. In operation, the turbid fluid is introduced at the open end 2, follows a helical whirling course through the tube, induced by the screw or helical flight 4, and emerges at the open end 3. Peculiar motion induced in the fluid by the screw or helical flight results in a marvelously efficient contacting of the contained solid particles and, consequently, very effective flocculation. For purposes of brevity, the patentee has termed this construction as a "spiralized tube", and the constantly changing effect on the flowing stream because of the helical-shaped blades or deflecting surfaces as a "spiralized flow."

It has been found that in some cases it is quite economical to provide a few turns of the screw, then leave the screw flights or vanes as open or spaced apart sections, thus leaving for a short distance an unspiralized section, then to provide a few more flight- or vane-sections and so on, having in view as an object of this construction the keeping down of the cost of the device. For the proper realizing of the present invention, it is desirable to have the guiding spiral provided by a stationary screw flight construction of sufficient total length to insure the required flocculation during the helical flow that is imparted to the stream incident to the stream flowing along and in engagement with the screw flight construction. Also as indicated, it is preferable to have the spiral or screw flight construction stationarily mounted in respect to the tube or conduit through which the stream flows whereby the gentle sliding, the gentle slip, or the gentle shear action herein described will be realized in contradistinction to any violent agitating action of a character which would otherwise tend to break up or disintegrate flocs already formed. In some cases it may be found desirable to increase the intensity of liquid movement by increasing the speed of rotation. This can be done by gradually decreasing the linear distance between turns, that is, by decreasing the linear pitch, that is by properly changing the pitch slope, or it may be accomplished by decreasing the diameter of the tube and by maintaining the same linear distance or same linear pitch between spiral turns.

This invention is based upon the discovery that the condition outlined can be obtained and is realized by apparatus employing the helical or screw-shaped construction herein described, and that by employing the principles described efficient and effective flocculation can be realized, with a relatively small expenditure of energy and with the experiencing of only a slight amount of violence or turbulence. By way of example, a paddle type of flocculating device will only stand a maximum speed of, say 20 units, because for that particular unit at a higher speed the difference between the paddles and the fluid traveling with the paddles at a speed of 20 would be too great as compared with the speed of the surrounding fluid traveling at less speed in back of the paddles or even at a zero speed. On the other hand, with the device as exemplified in Fig. 1, one can go to such velocities that the difference in speed between adjoining layers does not exceed 20. For instance, if we assume that the radius of the fluid column is 1000 particles there will be approximately 1000 rotating concentric cylinders, and since these can each rotate at a differential speed of 20 and since the inside cylinder will be rotating at zero speed, the outside cylinder may have a rotational speed of 20,000 units. That is, of course, a theoretical measure and cannot actually be obtained in practice. In actual operation, horizontal type of flocculating devices are run at speeds of from 0.6 to 1.8 ft. per second at the periphery. A 10" diameter spiralized conduit has been operated at peripheral velocities as high as 4 ft. per second with excellent flocculation. A tube of this diameter and about 30' long has been operated at such a capacity as to give a retention period of 50 seconds with excellent flocculation of a material which took from five to ten minutes to flocculate to a similar extent in a paddle type of flocculating device. Results have been obtained with this spiralized type of flocculating means in one minute which would be impossible with any other type developed up to this time. An advantage of the ability to operate at such high peripheral speeds is that the high peripheral velocity will keep the conduit clean, that is, will discourage silting where the feed contains a quantity of coarse material. It also means that where very wide fluctuations in flow rates are encountered as in water treatment plants, the flocculating tube can be so designed as to operate at the lowest flow at a sufficiently high velocity to prevent settling, while with increased flows the high resulting velocities will not be detrimental. That is to say, this type of unit is not subject to the very close limits inherent in the baffled type of flocculation chambers.

It is possible that a more definite understanding and comprehension of the invention will be had if the functioning thereof is compared with the functioning of already known flocculating devices or apparatus. Therefore, a device typical of those now in use for flocculation will be considered and compared to see and determine whether they produce the same effect. The only device which approaches this condition to any extent is the horizontal or vertical type of paddle agitator. As explained previously, the intention has always been to obtain a relative movement between agitating mechanism and fluid so as to obtain the desired turbulence. If the number of paddles were greatly increased or, to follow this suggestion to its logical conclusion, if the paddle area were sufficiently increased to swirl the entire contents of the agitator at the same speed as the agitator, there would be obtained a spiral movement effect of the stream particles. Such a device is illustrated in Figs. 8 and 9. Therein 101 represents a cylindrical container or tube that provides a conduit having a feed conduit 102 and discharge outlet 103; 104 represents a rotating paddle mechanism with radial paddles 105 so arranged as to just clear the inside surface of the tube or conduit 101 by an infinitesimal thickness 106. If one now considers the tube 101 to be full of fluid and the paddle mechanism as rotating, then under such conditions it will be noted that the entire fluid content will have imparted thereto rotation at the same speed as the paddle blades 105. As incoming liquid or fresh feed enters the tube or conduit 101 through the pipe 102, there is a longitudinal displacement of a corresponding volume of liquid in the direction of the discharge pipe 103. The particles or liquid sections are rotating with the paddle mechanism and they are forced forward by the incoming feed and therefore the paths of actual movement of the particles or liquid sections are spiral.

By referring now to Figs. 10A, 10B, 11 and 12, one can analyze the velocity and direction taken by particles or liquid sections at the center line 4ee'—4ee" (assuming the rotating paddle construction were such as to permit a longitudinal flow at the center of the tube or conduit 101) and at various radial distances from the center line such as 4dd', 4cc', 4bb' and 4aa'. As the distance from the center increases, the peripheral velocity of the paddles will be greater and therefore the peripheral or tangential velocity imparted to the particles. These velocities are represented by the vectors, for example, $ay$, $by$, $cy$ and $dy$, of the diagrams of Fig. 12, which said vectors in Fig. 12 extend at right angles or transverse to the longitudinal axis of the tube or conduit 101 of Fig. 10A. Since the hydrostatic pressure required to force the feed through the tube and out at 103 is the same at any point in the cross-section, the other component or vector represented by the lines of Fig. 10 which parallel the longitudinal axis of the tube or conduit 101, will be a constant quantity as shown. The lines or components just referred to and described as of the same lengths are designated as—$ax$, $bx$, $cx$, $dx$ and $ex$. Therefore, the vector sum of these two forces represented by the hypotenuses of the right angled triangles will be of varying intensity and varying directions as indicated. It will be noted that the general direction at similar diameters as compared with those of Fig. 7 are the same, but that whereas in Fig. 7 the absolute velocities as represented by $ah$, $bh$, $ch$, $dh$ and $eh$ are constant and the longitudinal velocities as represented by $a$, $b$, $c$, $d$ and $e$ vary, in this case the longitudinal velocity as represented by $ax$, $bx$, $cx$, $dx$ and $ex$ is constant and the absolute velocities as represented by $av$, $bv$, $cv$, $dv$ and $ev$ (the latter of which is the same as $ex$) vary. The results of this difference is that in the case of the paddle type of mechanism all of the particles remain in the same relative position. For instance, one can visualize that the water column is solid and that the feed introduced at 102 represents a force tending to push the column longitudinally.

It will be seen that in an apparatus such as is illustrated in Figs. 8 and 9, that it is perfectly logical to conclude that the solid column of water can and will be pushed longitudinally and obviously any particles or molecules or particular liquid sections therein will remain in the same position relative to each other. In the case of the arrangement of this invention, as illustrated by the apparatus of Fig. 1, this cannot be done because by the arrangement of said Fig. 1 a constant change of particles or liquid sections in respect to adjacent particles or liquid sections is taking place, viz., relative to each other and also relative to the body of the flowing stream within which they are located or of which they constitute a part. Therefore with a paddle mechanism or anything of a similar nature, a desirable internal movement of particles is not obtained.

Similarly if the spiral of Fig. 1 were rotated and the tube remained stationary, it is possible that the water column would move forward (disregarding frictional effects) as a solid column and the desired internal motion would not be obtained. It is therefore an essential part of this invention that the container and screw be in such relationship to each other that the liquid column itself move through and past these two elements, with the result that within the flowing body of liquid there is throughout the body a constant but gradual changing in the position of the particles or liquid sections of the liquid body relative to each other and relative to the liquid body as a whole. This same effect could be obtained if both the tube and the screw were rotated and the water or any fluid forced through and past them. It will be seen therefore that the essence of the invention lies in the fact that the fluid column or body is broken up into a large number of substantially longitudinally extending cylindric layers, which layers are then made to slide upon each other so as to obtain a large amount of contacting between particles in adjacent layers. This gentle sliding effect may be given the technical term "shear."

*Combined flocculation and sedimentation as illustrated in Figs. 13 to 18*

The combined units shown and described under this heading have been incorporated in the drawings and have been referred to herein in order to illustrate ways in which flocculating units embodying the flocculation phase of the invention can be readily embodied in or employed in conjunction with a sedimentation unit.

A combined flocculation and sedimentation unit is shown in cross-sectional elevation in Fig. 13, and according to the arrangement of this figure the new flocculating means or device is applied to a mechanically cleaned sedimentation tank or unit 11 of the Dorr type into which the liquid feed into the sedimentation unit is introduced through an inverted siphon 12. In the apparatus of this arrangement the flocculating means 13 is embodied in the construction providing the lower or bight portion 14 of the siphon. The tubular wall or shell that provides this lower or bight portion 14 of the siphon in fact constitutes the wall or peripheral shell of the flocculating means 13 just referred to, and there is fixedly positioned in the opening or conduit provided by this wall or shell 14 a screw or helical-shaped flight 15 which functions the same as the screw or helical-shaped flight heretofore described in conjunction with the arrangement of Fig. 1.

In the arrangement of Fig. 13 a down-take or feed pipe, which may be viewed as a down leg 16 of the siphon, is attached tangentially to the structure providing the bight portion of the siphon, to wit, to the structure providing the conduit of the flocculating means in the manner clearly illustrated in the lower left hand portion of Fig. 13, and in Fig. 14. According to the construction of the arrangement as shown in this figure, the feed or incoming liquid enters the flocculating means or device at approximately the same velocity that it would normally take due to the spiralizing. The incoming liquid or feed entering through the pipe 16, comes under the spiralizing influence of the screw or helical-shaped flight 15—the latter of which it is to be noted is shown as having a core opening along the center thereof. This screw, spiral or helical-shaped flight may be referred to as a spiralizer or spiralizing means and may be properly described as providing for a slow flow without permitting a settling therein of solids in the liquid, as providing a construction which prevents or avoids de-flocculation while permitting the flocculation or flocculating operation to proceed. The screw or helical-shaped flight may be viewed as a longitudinally extending member providing a series of fixed convolutions, the coils or flights of which extend about and are disposed along the longitudinal axis or axial section of the member and in the preferred arrangement and use of this member it is disposed so that the longitudinal axis thereof is horizontal or sufficiently approaches the horizontal whereby as the liquid flows forwardly through the conduit having the screw-shaped or spiral-shaped flow path, there will be realized a successive series of forward and upward flowing portions which convey therewith solids in suspension, thus avoiding any settling out and deposition of solids during the functioning of the flocculating means. The series of fixed convolutions imposes upon the flowing liquid progressively applied contortional forces. The result of the applied contortional forces and of the spiralizing flow movement is a continuous and constant shifting and warping of the internal arrangement of each flowing section. The spiralizing, shifting or warping movements are carried out until there is effected, yielded or realized a substantial coagmentation and amassment of flocculatable particles into settleable flocs and floc colonies. In this section the beneficial flocculation effect incident to the spiralizing of the flow stream is realized and therefrom the flocculated material gently passes upwardly, thence outwardly, into an enlarged influence delivery section or ring 17 from the lower section of which there is a downward and radially outward flow of liquid, so that under conditions favorable to sedimentation clarified effluent can pass into the effluent launder 18 and therefrom to the exterior of the sedimentation basin 11. The sedimentation basin is provided with any suitable sludge raking and conveying mechanism 19, which is relied upon for collecting the deposited sludge or other solids resulting from the sedimentation operation and for the delivery of the collected material into a sludge discharge member 20, from which the sludge passes through the conduit 20a on its way to a place of disposal.

In the apparatus of Fig. 15, there is illustrated a mechanically cleaned sedimentation unit or tank 21 of the Dorr type. According to the arrangement of this figure, there is employed a flocculating means or device which has included in conjunction therewith means for returning some of the flocculated material from the discharge end or section of the flocculating device to the intake end thereof. The flocculating device of this figure has a horizontal pipe or conduit 22 with a screw or helical-shaped flight 23 located therein and extending the full length thereof and which functions in substantially the same manner as the screw or helical-shaped flight member 4 of Fig. 1. In this Fig. 15 the incoming liquid to be subjected to flocculation and sedimentation is supplied by means of the trough 24 which discharges into a receiving basin 25 having a partition 26 therein which divides the receiving basin into an initial mixing and dosing chamber 27 and a discharge section 28. In this mixing and dosing chamber 27 there is normally carried out both a dosing operation and a mixing operation but it will be readily appreciated that if desired, it may at one time be employed so as to function only as a mixing chamber and that at another time it may be employed so as to function as a dosing chamber. It will be manifest from what has just been stated that the mixing chamber 27 is provided with means 29 having a valve controlled pipe 30 for supplying the desired amount of chemical coagulant or dosing material from the supply bath 31 therefor. In order to effect an intimate mix or efficient agitating and mixing of the dosing reagent 31, there is preferably employed a power-operated mixer 32 which functions because of the agitative action imparted to the dosed liquid by means of the propeller 33. The thus dosed liquid passes through the opening at 35, controlled by gate 34, into the delivery section 28 and thence into the tube 22 of the flocculating means or device whereby it forthwith comes under the operative and spiralizing influence of the tube or helical-shaped member 23. It has been found in many instances that a return of fresh flocculated liquid is desirable and hence return means broadly designated by 36, and which comprises the small return conduit 37, the pump 38, and small flocculating conduit 39, is provided. The operation of the return mechanism 36 just described is to withdraw liquid containing freshly flocculated material from the section 40 of the main flocculating means or to withdraw liquid containing sedimented material—sedimented flocculated material from the lower interior regions of the sedimentation unit or tank 21 depending upon the position of the angularly adjustable valve 47, which is operable from the exterior of the unit or tank 21 by suitable mechanism indicated as by mechanism 48—and to return the material thus withdrawn to the entrance end of the flocculating means whereby the returned material is delivered at 41 into position where it is early mixed with the incoming dosed material as the latter is about to come under the operative influence of the spiral or screw-shaped member 23. It will be noted that in Fig. 15 the valve 47 is shown in the position proper for the return of freshly flocculated material from the delivery section of the flocculating means back to the intake section thereof. The liquid which has been subject to flocculation is ultimately delivered into the central influent discharge member 42 from which it passes downwardly into the bath of liquid undergoing sedimentation and under conditions favorable to sedimentation and whereby clarified effluent ultimately passes into the effluent launder at 43 and thence from the sedimentation basin. Also according to the apparatus shown in this figure, any suitable mechanism as 44 is employed for collecting any sludge or other solids settling at the bottom of the sedimentation unit and whereby the collected sludge can ultimately be passed to and into the sludge sump 45 and from the sedimentation basin through the sludge discharge conduit 46.

In Figs. 16, 17 and 18, a mechanically cleaned sedimentation unit of the Dorr type is illustrated. This sedimentation unit functions in substantially the same manner as the other sedimentation units heretofore described, but in connection with the combined flocculation and sedimentation unit of Figs. 16, 17 and 18 there is illustrated a plural arrangement of flocculating devices, for example, flocculating devices imparting the essentials of the flocculating means described in connection with Fig. 1.

The arrangement of Figs. 16 to 18 contemplates a construction which is particularly advantageous for employment where the normal stream flows or, in other words, the normal flow of the liquid to be subject to flocculation and sedimentation has considerable variance in volume. It is desired to have a more or less uniform flocculating condition and this is attained, according to the arrangement of this figure, by having one flocculating device in operation during a low flow, by having an arrangement so that two flocculating devices automatically come into functioning and operation upon a substantially increased flow, and by having the arrangement so that a still further flocculating device (or still greater number of flocculating devices) can automatically come into operation according to further increases in flow. In these figures the three flocculating devices are respectively designated as 51, 52 and 53. They are arranged so as to horizontally extend into the upper portion of the sedimentation tank or basin 21 and each delivers into a central influent discharge section 54. The incoming liquid to be flocculated is initially received in the receiving basin 55 and it is to be noted (see Fig. 18) that the intake ends of the flocculating devices are arranged to receive liquid passed thereto through the receiving basin 55. This figure also shows the general elevation and arrangement of the flocculating devices as a set. This receiving basin is preferably divided by a partition 56 into a receiving section 57 and a discharge section 58, and the discharge section 58 is preferably divided by other partitions as 59 and 60 whereby the delivery section is sub-divided into delivery section 61 for the flocculating device 51, delivery section 62 for the flocculating device 52, and the delivery section 63 for the flocculating device 53. The partition 56 is also preferably provided with openings respectively designated as 64, 65 and 66, each of which is controlled by a corresponding valve member 67, 68 and 69, which is relied upon for adjustably controlling the size of flow passageway through the opening. These valve-controlled openings are arranged at different elevations and are relied upon for regulating, determining or controlling the flow of liquid from the receiving section 57 to the discharge sections 61, 62 and 63 for and respectively corresponding to the flocculating devices 51, 52 and 53, so that according to variations in flow conditions of the incoming liquid the proper or regulated amount of liquid for each flocculating device will be under adjustable control. Otherwise as indicated, the flocculating devices of the arrangement of Figs. 16 to 18 basically function substantially according to the description supplied in connection with the flocculating means or device of Fig. 1 and also according to the description of the flocculating means or devices described in connection with the arrangements of Figs. 13 and 15.

It will be apparent from certain of the illustrations herein given (see Figs. 13 to 18) that flocculating devices embodying or employing the present invention can be adapted very easily to existing types of sedimentation installations. As a pipe or conduit of some sort is necessary to bring the feed to the machine, it is very easy to spiralize this, viz. to incorporate therein a fixed helical or screw-shaped flight or blade, in order to add the flocculation step or to obtain the added advantage of mechanically induced flocculation.

*Modified forms of flocculating apparatus as shown in Figs. 19 to 23, inclusive*

It has heretofore been indicated that the essence of the construction of the flocculating unit can be embodied in various modifications without departing from the spirit and scope of the invention thereof. The essence of the construction and operation of the new flocculating means is shown and described in connection with the arrangement of Figs. 1 and 2 and the substance of the description and analysis heretofore presented in connection with explaining the arrangement of Figs. 1 and 2 and the operation thereof applies to the general features of construction and the operation of the various forms of apparatus illustrated in conjunction with Figs. 19 to 23 inclusive, and hence are not repeated herein.

As to the arrangement of Fig. 19, the tube or conduit 1 has located therein a screw or helical-shaped blade 4A that is constructed so that each section of the blade extends the full distance from the inside of the peripheral wall of the conduit 1 on the one hand to the axial center of the conduit on the other, thus avoiding what has been described in conjunction with the arrangement of Fig. 1 as a centrally located open core or corelike section. Otherwise than as indicated, the arrangements of Figs. 1 and 19 are identical.

As to the arrangement of Fig. 20, the tube or conduit 1 is provided with a screw or helical-shaped blade 4B which is quite similar to the arrangement of Fig. 1 with the exception that in the arrangement of Fig. 20 the linear pitch of the helices of the screw progressively increases in passing from one end of the conduit to the other. As shown, the linear pitch of the helix unit at the right hand end of the figure is equal to the diameter of the tube, whereas the linear pitch of the helix unit at the left hand side of the unit is only ⅕ of the diameter of the tube. Such a flocculating means or device if placed in one position, can manifestly be relied upon to effect a gradual slowing down in the velocity of the liquid flowing therethrough, or if placed in a reverse condition, can be relied upon for insuring that the velocity of the effluent will be considerably greater than the velocity of the influent.

Fig. 21 illustrates a construction in which the tube or conduit is made up of sections 1C, 1D, 1E, 1F, 1G, while the screw or helical-shaped blade that is located therein is composed of sections 4C, 4D, 4E, 4F, 4G. In this arrangement the helical member is constructed so that a core or corelike section is left along the longitudinal center of the flocculating means or device as a whole. The linear pitch of the spiral-shaped screw is in general equal to the diameter of the particular tube section in which the same is located; for example, in the section 1C the linear pitch of the screw flight is equal to the internal diameter of the section 1C; in the section 1E the internal diameter is equal to ½ of the internal diameter of the section 1C and the linear pitch of the screw flight 4E is equal to ½ the linear pitch of the helical section 4C, or, as otherwise expressed, is equal to the interior diameter of the section 1E. In the sections 1D and 1F the linear pitch progressively decreases in passing from section 4C to section 4E and progressively increases in passing from section 4E to section 4G. It will be noted that the linear pitch of the section 4G is equal to the length of the interior diameter of the tubular section 1G. An inspection of this Fig. 21 discloses the fact that there is experienced a relatively slower velocity of flow in section 1C than in section 1E with a progressive change in velocity in passing from 1C to 1E, and that there is a progressive slowing down in velocity in passing from 1E to 1G and that the velocity in 1G becomes the same as the velocity within 1C. Manifestly, varying flow conditions are realizable in and by the use of an apparatus such as shown in Fig. 21.

Figs. 22 and 23 illustrate a construction in which the peripheral confining walls such as provided by the peripheral wall sections of the tube, and the sections which define or impart the helical flow of or to the liquid undergoing treatment and which correspond to the screw-shaped flight 4 of Fig. 1, are embodied in the sections 1K and 4K which merge in each other, or, in other words, which are provided by the tubular walls of the helically bent member K in which, as it operates, liquid to be treated flows inwardly through 2K and from which the treated liquid or effluent flows outwardly through 3K.

It will be noted in connection with each of the flocculating means or constructions illustrating the present invention and in connection with the flocculating constructions as employed in or in conjunction with sedimentation basins or units, that the diameter of the flocculating conduit used and the pitch of the spiral blades or helical screw-flights are variables that can be adjusted to give the desired detention period for proper flocculation and the necessary surface or peripheral velocity to avoid settling out of suspended solids. The necessary energy for the operation of this device or process is provided entirely by the hydrostatic head of the fluid undergoing treatment, a condition requiring at the most only the expenditure of a small amount of energy for the proper operation or functioning of the apparatus. In a large conduit, the loss of head is very slight and will usually be available in most plants utilizing flocculation processes, but obviously where not available a pump can be used. In a smooth pipe, due to the retarding effect of the wall, a fluid will tend to flow in increasing velocities starting from the surface of the pipe at zero to a maximum at the center. The relative progressive change in fluid movement or velocity obtained in this way is, however, very small and with large pipes the differences in velocities between adjoining layers near the center of the tank and throughout the bulk of the cross-section are very negligible. In order to obtain any appreciable relative change in internal movement in large conduits devoid of internal blades, vanes or other deflecting or guiding elements, the velocity of flow would have to be so great as to make the detention period too short for any appreciable flocculation and the loss of head would be prohibitive. A large number of tests have been carried out on internally smooth or internally uninterrupted tubes or conduits, and the results demonstrate that at the most only a slight flocculating effect is possible with such smooth pipes or conduits even though the size is small, viz., 2″ or less. In large smooth pipes the flocculating effect is relatively negligible.

For a more precise understanding of our invention, it may be well to bear in mind the meaning we give to certain words and phrases used herein. For instance, helix, helical, spiral and spiralized have been used, and what is meant by them is really a helical-spiral as exemplified by a screw-thread on a machine-screw, namely—where the loops or end of the helix never goes to the center or axis of the helix. There has also been used the word "swirl", by which is meant rotation gentle enough to be without eddies and to be at a speed insufficient to encourage essential disintegration or breaking up of formed and forming relatively fragile flocs. The word "turbulence" has been used which we take to mean a disturbed state produced by violent agitation.

To the extent that such agitation would be harmful to flocs, we aim to avoid it. Something has been said about eddies, although we desire to avoid their occurrence unless they are gentle enough not to be harmful to the flocs.

We believe we are the first to construct for use as a flocculating means or device, a tube or conduit wherein a helical flow path as defined by stationary part or parts is relied upon for effecting a three-dimension slip or movement of any one particle or section relative to all other particles or sections or lamellae of a liquid stream, or, as otherwise expressed, for the purpose of aiding or furthering flocculation which is carried out incident to the spiralized movements of the stream sections through the tube or conduit due to the guiding influence or direction of a screw flight or helical-shaped blade along which the stream flows while directed thereby.

We believe we are the first to employ the novel type of flocculating means herein disclosed as a part of or in conjunction with a sedimentation basin or unit. The sedimentation unit herein disclosed functions in any suitable manner, as, for example, according to the modes already known. The flocculation operation herein disclosed may be employed or relied upon to aid in the more complete sedimentation and the settling of small particle or material content that does not readily respond to sedimentation unless a flocculation operation is performed as a step preliminary to the sedimentation of such particles or material content.

Fe also believe we are the first to provide a sedimentation unit with a plurality of flocculating devices constructed and arranged so that one or more of the flocculating devices automatically function according to the variable flow conditions of the supply stream about to undergo flocculation and sedimentation.

It will be manifest from what has preceded that the flocculating means, device, or devices, can be embodied in various forms or modifications without departing from the spirit and scope of the present invention as defined in and by the claims hereof, and that it can also be employed in many ways and forms in conjunction with sedimentation units or even for other purposes without departing from the spirit and scope of the invention as covered by the claims.

What is claimed is:

1. In the treating of liquid containing potential floc-forming material a process which comprises establishing and maintaining an initial body of said liquid wherein the floc-forming material is intimately mixed therewith and dispersed throughout the same, continuously flowing a quantity of such liquid from said initial body along a flocculation flow-path provided within a conduit comprising a substantially horizontal tubular portion equipped with a screw-shaped guide having a plurality of turns about a longitudinally extending axis for subdividing said flowing liquid body into spiral-shaped sections of which the internal arrangement is continuously shifting consequent to the spiralized flow, continuing said spiralized flow until there result settleable flocs, continuously flowing under the influence of gravity the liquid with the flocs suspended therein from the flocculation flow path into an established subsequent body of liquid wherein a state of quiescence is maintained favorable to the settling of the flocs and whose liquid level is at least substantially as high as that of the upper portion of the continuously-flowing spiral-shaped sections; continuously flowing supernatant liquid from the upper portion of said quiescent subsequent body, and withdrawing sedimented particles from the lower portion of said quiescent subsequent body.

2. In the treating of liquid containing floc-forming material a process which comprises establishing and maintaining an initial body of said liquid wherein the floc-forming material is dispersed throughout the same, continuously supplying and flowing the same to and through a continuously filled flocculation conduit comprising a tubular section with fixed spiralizing means having successive turns disposed about a line having sufficient approach to the horizontal for defining a series of successive flow convolutions of which certain portions provide upflow paths while other portions provide downflow paths for continuously contorting and spiralizing the flowing liquid, continuing said contorting and spiralizing flow until settleable flocs result, establishing in constant hydraulic communication with the liquid within said flocculation conduit a relatively quiescent body of liquid adapted for sedimenting liquid passed thereto from said flocculation conduit and whose normal surface level thereof is at an elevation sufficiently high for insuring that the liquid within the flocculation conduit at all times will at least substantially fill said series of flow convolutions, continuously flowing liquid with flocs suspended therein and drifting therewith from said liquid in said flocculation conduit to said quiescent body, continuously withdrawing supernatant liquid from the upper portion of said quiescent body whereby to determine the normal minimum surface level thereof, and withdrawing sedimented material from the lower portion of said quiescent body.

3. Liquid clarification process comprising continuously feeding liquid with floc-forming material therein and intimately dispersed throughout the same to a flocculation body of liquid contained within a substantially horizontally-extending tubular conduit provided with a flow path having a plurality of complete turns about a longitudinally-extending line that are in effect spiralizing means, continuously flowing liquid of said body within and along said conduit while maintaining the conduit completely liquid-filled and therein contorting and spiralizing the flowing liquid until there are thus developed settleable flocs, maintaining in constant hydraulic communication with said flocculation body a body of liquid quiescently favorable for the sedimentation of suspended solids therein whose liquid level is above at least a substantial portion of the liquid-containing section of said conduit, continuously flowing by gravity liquid from said flocculation body to said quiescent body, continuously flowing clarified supernatant from the upper section of said quiescent body, and withdrawing sediment from the lower section of said quiescent body.

4. In an apparatus for treating liquid containing potential floc-forming particles, a sedimentation unit provided with supernatant liquid-withdrawal means leading from the upper portion thereof for establishing a normal operative level within the apparatus, a horizontally-extending tubular conduit delivering into the sedimentation unit and located at an elevation lower than that of the normal operative level as established by the supernatant liquid-withdrawal means, a horizontally-extending screw in fixed relation with respect to the tubular conduit and housed thereby, a feeding means leading to the intake section of the tubular conduit downwardly from an elevation that is higher than that of the normal operative level as established by said supernatant liquid withdrawal means, and means for passing liquid containing flocs from the lower portion of the sedimentation unit backwardly to a previous section of tubular conduit whereby the return flocs are available for serving as floc nuclei within the tubular conduit section containing the horizontally-extending screw.

5. Clarification apparatus for liquid with flocculatable material therein having a sedimentation tank provided with sediment-discharge means leading from the lower portion of said tank; mechanism provided in association with said tank for passing therefrom settled solids in the form of sediment; effluent means for passing supernatant liquid from said tank and disposed for determining the normal liquid level in said tank; influent means comprising a tubular conduit in constant hydraulic communication with the liquid-holding portion of said tank and having a substantially cylindrical conduit section and a tapered conduit section; and spiralizing liquid-contorting means comprising a spiral flight-providing element having linear extent within said conduit sections for at least a plurality of convolutions and of which the flight has flow-directing face portions the radial dimension of each of which is equal to at least a half of the radius of the particular conduit section in which it is located, which spiral flight-providing element is for spiralizing liquid while passing through the conduit and for imposing upon the flowing liquid contortional changes that are characterized by the presence in the liquid emitted from the tubular conduit of suspended but settleable flocs.

6. Liquid clarification apparatus comprising a liquid sedimentation unit having a supernatant liquid withdrawal means leading from the upper portion of the unit by which there is normally determined the level of the liquid undergoing a settling operation within the sedimentation unit; a conduit leading to the sedimentation unit providing a substantially horizontally-disposed section extending at an elevation below that of the normal level of the liquid in the sedimentation unit; feeding means leading to an intake section of said conduit; means for supplying a dosing agent to such feeding means; power actuated mechanical mixing means operatively disposed for intimately mixing and dispersing the dosing agent with and throughout the liquid in said feeding means; and a screw-shaped flight located within the horizontally-disposed section, extending proximate the inside surface of said conduit for functionally aiding in the flocculation of particles in the liquid as the liquid passes through the conduit.

7. An apparatus for treating liquid containing suspended flocculatable matter comprising in combination a flocculating unit, liquid-feeding means therefor, a sedimentation unit, and a device for conveying flocculated material from a stage within one of said units back to a preceding stage within the flocculation unit; said flocculation unit comprising a substantially horizontal tubular conduit into one end portion of which the incoming feed liquid is received and from the opposite end portion of which the liquid with flocculated particles therein is passed into the sedimentation zone, a screw flight in fixed relation in the conduit for effecting coagmentation of the suspended particles into settleable flocs as the liquid contacts said particles passing through the tubular conduit.

8. The treating of liquid containing flocculatable material by a process comprising establishing in a relatively horizontally-extending flocculation zone a body of flowing liquid containing said material, continuously feeding to said body liquid to be treated, subdividing said body into interpositioned screw-shaped flow sections each having a series of complete convolutions, subjecting the liquid in said flow sections to progressively applied spiralizing forces for progressively warping and contortionally changing the screw-shaped flow sections until there result developed settleable flocs, flowing liquid with settleable flocs in suspension therein from said flocculation zone to a sedimentation zone whose liquid level is normally maintained at an elevation higher than at least a portion of said screw-shaped flow sections, collecting and returning some of the resulting settleable flocs to an early stage of sections wherein the warping and contortional changes take place in order that the returned flocs may function as nuclei to accelerate the flocculation operation therein, flowing supernatant liquid as clarified effluent from the upper portion of the sedimentation zone when the normal level thereof tends to be exceeded, and withdrawing sedimented material from the lower portion of the sedimentation zone.

JOHN VAN NOSTRAND DORR.